United States Patent [19]
Erb

[11] Patent Number: 6,045,119
[45] Date of Patent: Apr. 4, 2000

[54] LIQUID DISTRIBUTION VALVE

[75] Inventor: Rene Erb, Phalsbourg, France

[73] Assignee: VITOP (Enterprise Unipersonnelle a Responsabilite Limitee), Schalbach, France

[21] Appl. No.: 09/142,801

[22] PCT Filed: Mar. 25, 1997

[86] PCT No.: PCT/FR97/00529

§ 371 Date: Sep. 23, 1998

§ 102(e) Date: Sep. 23, 1998

[87] PCT Pub. No.: WO97/35802

PCT Pub. Date: Oct. 2, 1997

[30] Foreign Application Priority Data

Mar. 27, 1996 [FR] France ................................ 96 04029

[51] Int. Cl.⁷ ............................ F16K 7/12; F16K 31/524
[52] U.S. Cl. ...................................... 251/251; 251/335.2
[58] Field of Search ........................... 251/215, 251, 251/252, 253, 263, 331, 335.2, 229

[56] References Cited

U.S. PATENT DOCUMENTS

| | | | |
|---|---|---|---|
| 2,074,240 | 3/1937 | Saunders | 251/263 |
| 2,855,176 | 10/1958 | Boteler | 251/252 |
| 3,747,894 | 7/1973 | Pepper | 251/215 |
| 5,029,806 | 7/1991 | Huo-Lin et al. | 251/263 |
| 5,103,857 | 4/1992 | Kuhn et al. | 251/263 |
| 5,294,093 | 3/1994 | Huveteau et al. | 251/263 |
| 5,435,339 | 7/1995 | Hayes | 251/215 |
| 5,771,924 | 6/1998 | Huygen | 251/335.2 |

FOREIGN PATENT DOCUMENTS

| | | |
|---|---|---|
| 0 432 070 | 6/1991 | European Pat. Off. . |
| 1225889 | 7/1960 | France ........................... 251/253 |
| 34924 | 3/1886 | Germany . |
| 2 188 399 | 9/1987 | United Kingdom . |
| WO 94/29214 | 12/1994 | WIPO . |

Primary Examiner—George L. Walton
Attorney, Agent, or Firm—Young & Thompson

[57] ABSTRACT

A self-closing liquid distribution valve, particularly for esculent liquids, essentially consisting of a body (1) for mounting the valve in the opening of a container, and a liquid release plunger (2) engaging a resilient sealing membrane (3) secured to the body (1). The valve is provided with elements (4',4") for retaining the plunger (2) in the open position.

10 Claims, 2 Drawing Sheets

LIQUID DISTRIBUTION VALVE

FIELD OF THE INVENTION

The present invention relates to the field of the distribution of liquids contained in small rigid, semi-rigid or flexible containers, in particular liquid foodstuffs, these receptacles being provided for this purpose with distribution valves, and has for its object such an automatic closing valve provided with means for maintaining it in the open position.

BACKGROUND OF THE INVENTION

At present, the distribution of liquid foodstuffs, particularly table wines, fruit juices or ultrahigh temperature pasteurized milk, from small rigid, semi-rigid or flexible receptacles, such as plastic bags, is generally carried out by means of valves fixed on the outlet opening of the receptacles.

To this end, there is known more particularly from EP-A-0 432 070, a valve constituted by a body for mounting in the opening of a receptacle and by a piston for releasing liquid, loaded by a spring and guided in the body, the piston acting on a resilient sealing membrane secured to the body. The mounting body in the opening is provided with a securement neck comprising a throat coacting snap-fittingly with an annular projection on the opening, thereby preventing any removal of the valve.

To operate it, the piston is provided, at its upper portion, with appendices, extending outside the valve through openings in this latter and adapted to permit imposing traction on the piston, so as to free the distribution opening, closing taking place automatically.

The integrity of this valve permits avoiding any fraud, by preventing refilling, because of the impossibility of removing the valve from the opening of the receptacle.

Such valves permit correct distribution of the liquid and are perfectly adapted either for a bottling operation or a succession of withdrawals, regardless of whether the latter are carried out in a sterile environment, such as a sterile chamber with aseptic filling, or not, for example for filling glasses or small receptacles, which is to say for private or commercial use for small quantities of a single beverage or a single vintage.

However, in the case of large quantities of liquid in restaurants or the distribution of different vintages by the glass, several receptacles are used simultaneously and the space they occupy requires their installation in a separate space and their connection by means adapted for a distribution bank with multiple valves.

To this end, it is provided to arrange a connection device between the distributor and the valve of the receptacle, this device permitting sealed and rapid connection of the valve outlet of the receptacle to a conduit and maintaining this valve in the distribution position during all the duration of the connection.

However, these known connection devices are bulky and cumbersome. Also, it is of particular interest, in such a case, to provide for carrying out the connection of the conduit and the opening of the valve with a minimum of simple movements.

Moreover, for reasons of economy, in the case of the distribution of alcoholic beverages, the valve on the receptacle must be taxable, which is to say that it must be provided with a tax stamp or the like, which has to be destroyed for first use, so as to avoid any fraud.

SUMMARY OF THE INVENTION

The present invention has for its object to overcome the drawbacks of the connection devices and of the existing valves and to provide an automatic closing valve, which can be maintained in open position, so as to permit simple and rapid connection to a valve of a distribution bank.

According to the invention, the liquid distribution valve, in particular for liquid foodstuffs that are sterilized or not, that closes automatically, which is essentially constituted by a mounting body in the opening of a receptacle and by a piston for freeing the liquid acting on a resilient sealing membrane secured to the body, is characterized in that it is provided with means for maintaining the piston in open position.

BRIEF DESCRIPTION OF THE DRAWINGS

The invention will be better understood from the following description, which relates to preferred embodiments, given by way of non-limiting examples, and explained with reference to the accompanying schematic drawings, in which.

DETAILED DESCRIPTION OF THE INVENTION

The figures of the accompanying drawings show a liquid distribution valve, in particular for liquid foodstuffs, that closes automatically, which is essentially constituted by a body 1 for mounting in the opening of a receptacle and by a piston 2 for freeing the liquid, acting on a resilient sealing membrane 3 secured to the body 1.

Figure 2:
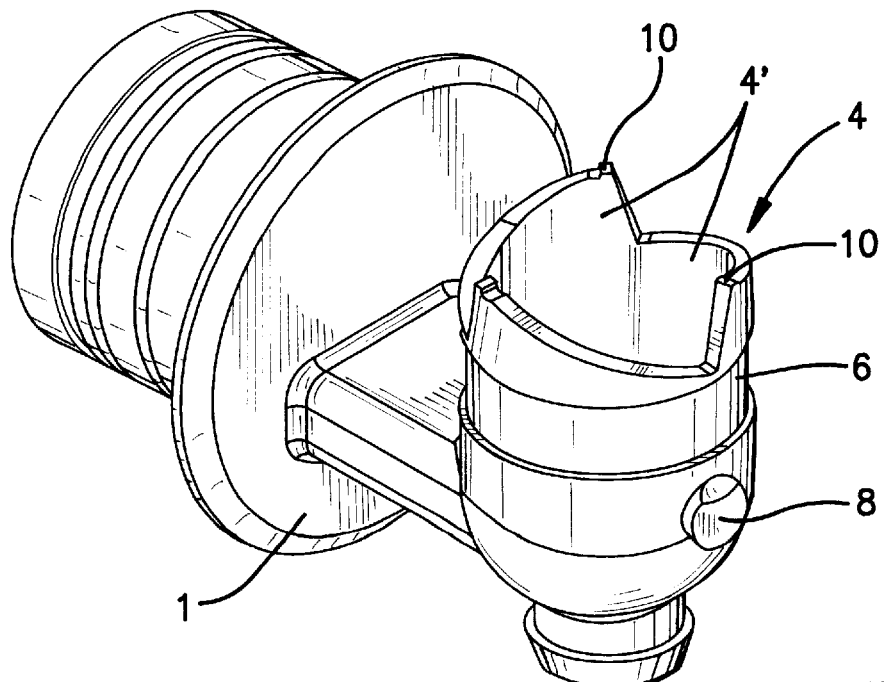
FIG. 2 is a view similar to that of FIG. 1 showing the valve body alone.
Figure 3:
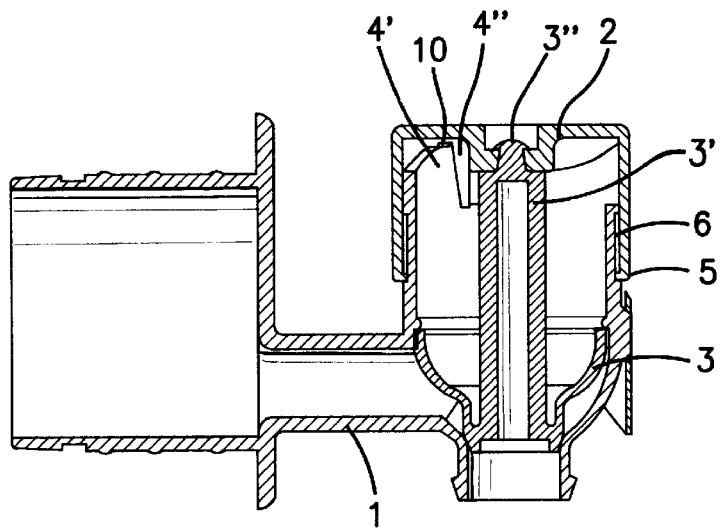
FIG. 3 is a side elevational and cross sectional view of the valve in closed position.
Figure 4:
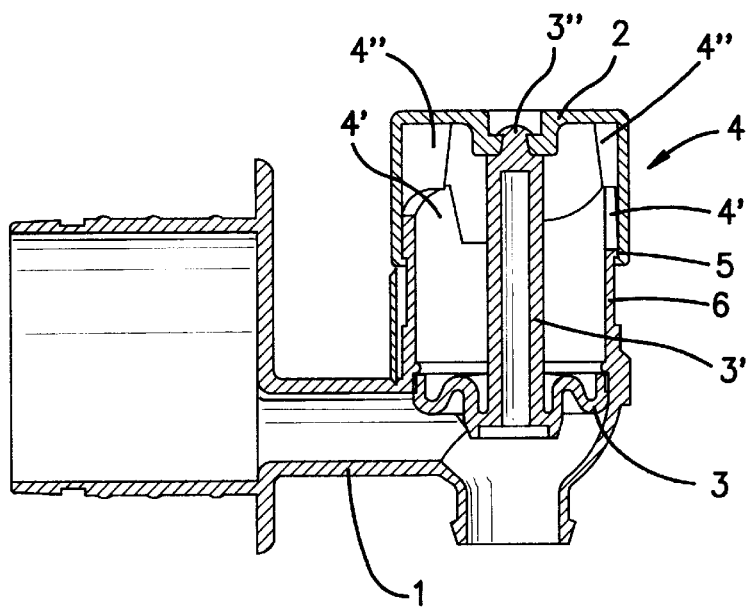
FIG. 4 is a view similar to that of FIG. 3, the valve being in the open position.

According to the invention and as shown in FIGS. 2 to 4 of the accompanying drawings, this valve is provided with means 4 for maintaining the piston 2 in open position. This means 4 consists essentially of elements 4' and 4" of coacting shape provided respectively on the body 1 of the valve and on the piston 2.

According to a characteristic of the invention, the elements 4' and 4" forming the means 4 are constituted respectively by cams extending over the portion of the body 1 of the valve forming the seat of the resilient sealing membrane 3 and by the guidance of the piston 2 and by slides disposed at regular intervals over a portion of the piston 2 extending concentrically above said cams of the body 1 (FIGS. 2 to 4).

The piston 2 is preferably constituted by a hollow operating knob slipped over the portion of the body 1 of the valve forming the seat of the resilient sealing membrane 3 and the guidance of said piston 2 and is connected, with the possibility of free rotation, to the resilient sealing membrane 3 secured to the body 1. The piston 2 is moreover provided with means 5 for maintaining it by snap action on the corresponding portion of the body 1, by coaction with a peripheral throat 6 extending below the cams forming the elements 4' of the means 4, this means 5 being in the form of an interior end shoulder. Thus, after snapping of the piston 2 over the corresponding portion of the body 1, said piston 2 is maintained on the body 1 against removal.

The slides forming the elements 4" provided on the piston 2 are disposed on the internal cylindrical wall of the knob forming the piston 2, on the side opposite the shoulder forming the means 5 for snap action holding, their lower end being at a distance from said shoulder slightly greater than the height of the cams 4' from the peripheral throat 6. Thus, the slides 4" are guided concentrically on the cams 4' and, upon rotation of the knob forming the piston 2, they are pressed against the slope of these latter and deform the resilient sealing membrane 3 in the direction to open the valve (FIG. 4)

The cams 4' are preferably of asymmetrical slope and have an upper flat portion for bearing on the lower end of the slides 4", which have the shape of a triangular point with a rounded end. It results that the opening of the valve can be easily effected by sliding of the slides 4' up the slope of the lowest inclination of the cams 4', the maintenance in open position taking place by the pressure of the slides 4" on the upper portion of said cams 4'. For automatic closure, it suffices to effect a slight supplemental rotation of the knob forming the piston 2, the slides 4" then sliding by their end over the greatest slope of the cams 4' under the influence of the traction exerted by the resilient sealing membrane 3. An incomplete rotation of the knob, tending to press the slides 4" against the steepest slopes of the cams 4', and successive release, will have the effect of automatically carrying out closure upon release of said knob.

According to another characteristic of the invention, the cams 4' are preferably provided, at the end of the flat upper portion, on the side of the steepest slope, with a device 10 for positional arrest of the slides 4", in the form of an end projection. Such a device 10 for stopping the position of the slides 411 permits the operator easily to control the irreversible opening position of the knob 2, by simple determination of the arrival in abutting relationship of said slides 4", manifesting itself by a difficult point in the rotation.

According to another characteristic of the invention, the resilient sealing member 3 is provided with a shaft 3', of one piece with said membrane 3 and provided at its free end with a bearing 3" for connection with the possibility of rotation of the knob forming the piston 2. Such a connection permits vertical displacement of the membrane 3 and its deformation by collapsing during rotation of the knob 2 without the membrane 3 thereby being subjected to shearing deformation, which would be harmful.

The knob forming the piston 2 is preferably provided in a known manner at the periphery of its upper portion with knurling 7 promoting its gripping and its operation.

Figure 1:
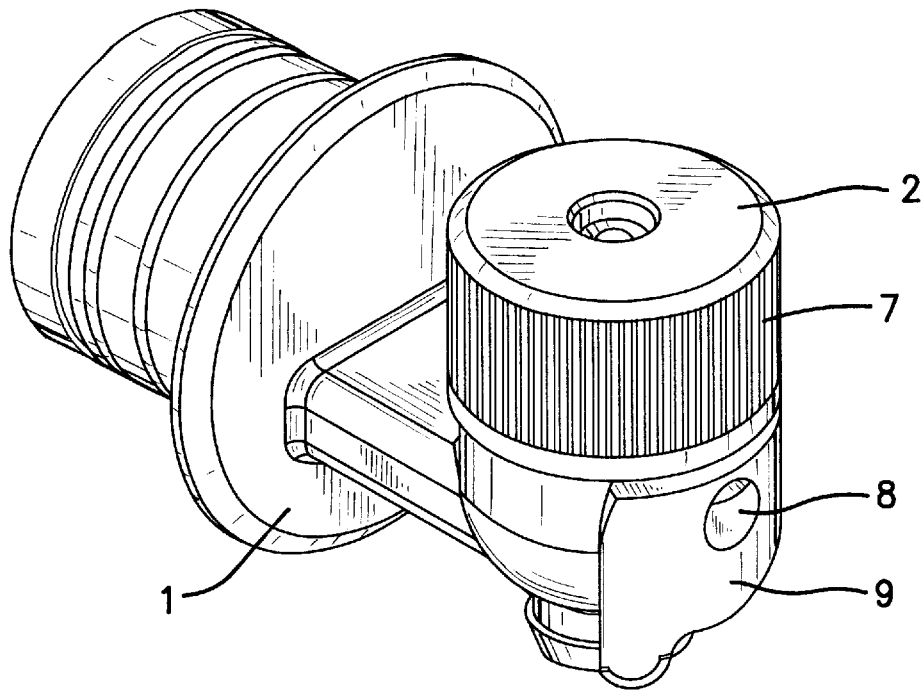
FIG. 1 is a perspective view of the valve according to the invention.

According to another characteristic of the invention, and as shown more particularly in FIGS. 1 and 2 of the accompanying drawings, the body 1 of the valve is provided, below the peripheral throat 6, with a lug 8 adapted to coact with a hole of corresponding shape of a tearable cap 9 connected to the knob 2 by means (not shown) having a gluing surface for a tax stamp. Thus, a rotation of the knob 2 is provided until the cap 9 is torn, because of the coaction of the hole provided in this latter with the lug 8 of the body 1, the tearing of the cap 9 having for its effect to sever the tax stamp, at least at the level of its contact with the lug 8, such that it is rendered unusable. As a result of this embodiment, the valve is inviolable during transportation and storage. Thus, the indispensable safety for handling aseptic liquid foodstuffs, such as fruit juice or ultra high temperature pasteurized milk, is ensured. This inviolability permits detecting instantaneously unauthorized use.

In a known manner, the end of the outlet of body 1 of the valve is provided with peripheral holding means projecting from one end of the flexible conduit, of a type known per se, permitting rapid connection of such a conduit.

In FIGS. 1 to 4 of the accompanying drawings, the valve is shown with its piston 2 extending perpendicularly to the axis of the mounting body in the opening of a receptacle; however, it is also possible to provide that the body of the valve extend in an inclined manner relative to the perpendicular to this axis or else parallel or coaxial to this latter.

Figure 5:
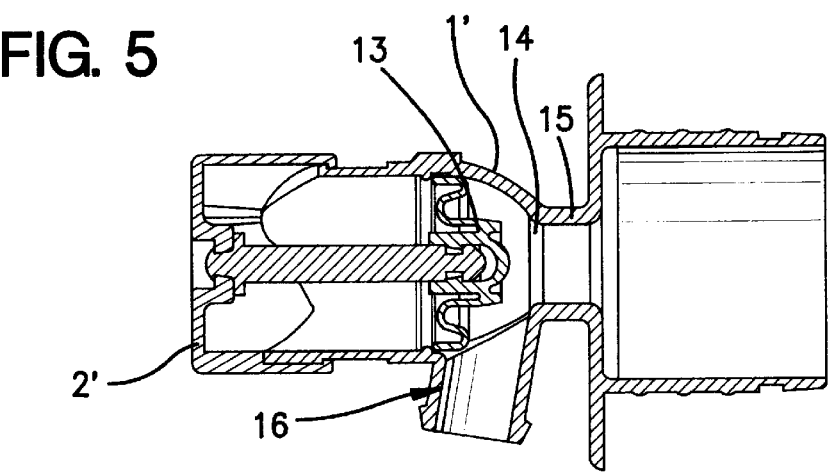
FIG. 5 is a view similar to that of FIG. 4 of a modified embodiment of the invention.

Thus, FIG. 5 of the accompanying drawings shows a modified embodiment of the invention, in which the body 1' of the valve extends in prolongation of the mounting body in the opening of a receptacle and coaxially to this latter, its piston 2' also extending coaxially to the mounting body, the corresponding sealing membrane 13 bearing directly on an opening 14 provided in a channel 15 for connection between said mounting body in the opening of the body 1' of the valve, downstream of the pouring orifice 16 of this latter. Such an embodiment is particularly desirable in the case of valves adapted for the distribution of aseptic liquids.

Thus, in this case, the sealing of the resilient membrane 13 is carried out solely at the level of the seat 14, namely at a single point, in contrast to the embodiment shown in FIGS. 1 to 4 of the accompanying drawings, in which the sealing must also be guaranteed at the level of the junction of the membrane with the body of the valve. As a result, the risks of contamination are considerably diminished.

Thanks to the invention, it is possible to provide an automatic closing valve permitting its maintenance in open position, as well as rapid closing or else impulsive opening with rapid closing.

Of course, the invention is not limited to the embodiment described and shown in the accompanying drawings. Modifications remain possible, particularly as to the construction of the various elements or by substitution of technical equivalents, without thereby departing from the scope of protection of the invention.

I claim:

1. A liquid distribution valve with automatic closing, comprising a valve body for mounting in an opening of a receptacle and a piston for freeing the liquid acting on a resilient sealing membrane secured to the valve body, said valve being provided with means for maintaining the piston in an open position consisting of elements of complementary shape provided respectively on the valve body and on the piston, wherein the elements are constituted respectively by cams extending over a portion of the valve body that provides a valve seat thereon for movement of the resilient sealing membrane between open and closed valve positions as the piston is guided and moved along said valve body, and by slides disposed at regular intervals over a portion of the piston extending concentrically above said cams, wherein the piston is constituted as a hollow operating knob as a flexible snap-on sleeve that encloses said cams, said sleeve being slidably positioned over and along an exterior portion of the valve body, said sleeve being connected for allowing the possibility of free rotation to the resilient sealing member secured to the valve body.

2. The valve according to claim 1, wherein the piston includes retention means for maintaining said piston by snap action on a corresponding portion of the body, by coaction with a peripheral throat extending below the cams, said retention means being in the form of an interior end shoulder.

3. The valve according to claim 2, wherein the slides forming the elements provided on the piston are disposed on an internal cylindrical wall of the piston, on a side opposite the shoulder forming the retention means, said slides having a lower end which is at a distance from said shoulder slightly greater than the height of the cams from the peripheral throat.

4. The valve according to claim 2, wherein the piston is constituted as a hollow operating knob, and the valve body is provided below the peripheral throat, with a lug adapted to coact with a hole of corresponding cross section in a tearable cap connected to the knob by perforations and having a gluing surface for a tax stamp.

5. The valve according to claim 1, wherein the cams have an asymmetrical slope and have a flat upper bearing portion pressed against by the lower end of the slides, which have the shape of a triangular point with a rounded end.

6. The valve according to claim 5, wherein the cams are provided at the end of the upper flat portion, on the side of greatest slope, with a device for positionally stopping the slides, said device being in the form of an end projection.

7. The valve according to claim 1, wherein the resilient sealing membrane is provided with a shaft, of one piece with said membrane and provided at its free end with a bearing for connection with possibility of rotation of the knob forming the piston.

8. The valve according to claim 1, wherein the knob forming the piston is provided at the periphery of its upper portion, with knurling promoting its gripping and its operation.

9. The valve according to claim 1, wherein the valve body extends inclined relative to the perpendicular to the axis of a mounting body in a receptacle.

10. The valve according to claim 1, wherein the valve body extends in prolongation of a mounting body in an opening of a receptacle and coaxially to said receptacle, the piston also extending coaxially of the mounting body, the corresponding sealing membrane bearing directly on a seat provided in a channel for connection between said mounting body in the opening of the valve body, downstream of an outlet flow opening of said valve body.

* * * * *